(12) United States Patent
Horvitz et al.

(10) Patent No.: US 10,936,676 B2
(45) Date of Patent: *Mar. 2, 2021

(54) COMPENSATING FOR BIAS IN SEARCH RESULTS

(71) Applicant: MICROSOFT TECHNOLOGY LICENSING, LLC, Redmond, WA (US)

(72) Inventors: Eric Joel Horvitz, Kirkland, WA (US); Ahmed Hassan Awadallah, Redmond, WA (US); Ryen William White, Woodinville, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 266 days.

This patent is subject to a terminal disclaimer.

(21) Appl. No.: 15/988,244

(22) Filed: May 24, 2018

(65) Prior Publication Data

US 2018/0268061 A1 Sep. 20, 2018

Related U.S. Application Data

(63) Continuation of application No. 14/611,085, filed on Jan. 30, 2015, now Pat. No. 10,007,730.

(51) Int. Cl.
*G06F 16/00* (2019.01)
*G06F 16/951* (2019.01)

(52) U.S. Cl.
CPC .................. *G06F 16/951* (2019.01)

(58) Field of Classification Search
CPC ............... G06F 16/951; G06F 16/4393; G06F 16/9535; G06F 17/958; G06F 17/30867; G06N 20/00; G06N 7/005; G06N 5/02; G06Q 10/06; G06Q 30/0641; H04L 65/4084; H04L 65/80; H04L 67/1044; G01C 21/3679

See application file for complete search history.

(56) References Cited

U.S. PATENT DOCUMENTS

| | | | | |
|---|---|---|---|---|
| 7,797,635 B1* | 9/2010 | Denise | ............... | G06F 16/9038 |
| | | | | 715/738 |
| 8,713,007 B1* | 4/2014 | Korolev | ............... | G06F 16/353 |
| | | | | 707/729 |
| 2002/0078045 A1* | 6/2002 | Dutta | .................... | G06F 16/951 |
| 2005/0102276 A1* | 5/2005 | Dinh | ................ | G06F 16/24554 |

(Continued)

OTHER PUBLICATIONS

White, et al., "Caption and Biases in Diagnostic Search", In Journal of ACM Transactions on the Web, vol. 7, Issue 4, Oct. 2013, 28 Pages.

(Continued)

*Primary Examiner* — Anh Ly
(74) *Attorney, Agent, or Firm* — Merchant & Gould P.C.

(57) ABSTRACT

Biases in search and retrieval (i.e., situations where searchers seek or are presented with information that significantly deviates from the truth) may be detected by comparison to one or more authoritative sources. Once bias or potential bias is detected, techniques may be applied to indicate and/or compensate for the bias. Such techniques may allow users to more easily assess the veracity of search results, and increase the chances that users will locate accurate answers to their questions.

20 Claims, 13 Drawing Sheets

(56) References Cited

U.S. PATENT DOCUMENTS

| | | | | |
|---|---|---|---|---|
| 2005/0278321 | A1* | 12/2005 | Vailaya | G06F 16/951 |
| 2006/0042483 | A1* | 3/2006 | Work | G06Q 10/00 |
| | | | | 101/91 |
| 2006/0242147 | A1* | 10/2006 | Gehrking | G06F 16/951 |
| 2007/0038600 | A1* | 2/2007 | Guha | G06F 16/951 |
| 2008/0077570 | A1* | 3/2008 | Tang | G06F 16/3346 |
| 2009/0172514 | A1* | 7/2009 | Radovanovic | G06F 16/9038 |
| | | | | 715/212 |
| 2010/0153370 | A1* | 6/2010 | Gollapudi | G06F 16/958 |
| | | | | 707/722 |
| 2015/0310114 | A1* | 10/2015 | Ryger | G06F 16/93 |
| | | | | 707/728 |
| 2015/0324433 | A1* | 11/2015 | Duffy | G06F 16/248 |
| | | | | 707/722 |

OTHER PUBLICATIONS

White, R.W., et al., "Content Biases in Online Health Search", In Journal of ACM Transactions on the Web, vol. 8, Issue 4, Oct. 2014, 33 Pages.

* cited by examiner

WWW.SEARCHSITE.COM

SEARCH QUERY | CHEST PAIN

CHANCE OF CONDITION GIVEN THE SYMPTOM "CHEST PAIN"
MUSCLE FATIGUE  64%
INJURY          20%
INDIGESTION     14%
HEART ATTACK    1%
OTHER           1%

☐ HEART ATTACK SYMPTOMS – WWW.ABCMEDICAL.COM
IF YOU ARE HAVING CHEST PAIN, CALL A MEDICAL PROFESSIONAL
IMMEDIATELY BECAUSE YOU MAY BE HAVING A HEART ATTACK
☐ WHAT CAUSES CHEST PAINS? – WWW.NETMD.COM
THE LEADING CAUSE OF CHEST PAIN IS MUSCLE FATIGUE. HOWEVER,
CHEST PAIN CAN BE A SYMPTOM OF A MORE SERIOUS CONDITION
☐ SELF DIAGNOSIS – WWW.DIAGNOSEYOURSELF.COM
SHOULD YOU BE CONCERNED ABOUT CHEST PAIN? THE MOST COMMON
CAUSES OF CHEST PAIN ARE MUSCLE FATIGUE, INJURY ….
☐ TREATING CHEST PAINS – WWW.PHYSICALTHERAPY.COM
THERAPY FOR CHEST PAINS OFTEN INCLUDES APPLICATION OF HEAT
AND COLD. HOWEVER, YOU SHOULD CONSULT A LICENSED …
SEE MORE

FIG. 5B

COMPENSATING FOR BIAS IN SEARCH RESULTS

CROSS-REFERENCE TO RELATED APPLICATIONS

This application is a continuation of U.S. patent application Ser. No. 14/611,085, filed Jan. 30, 2015, now U.S. Pat. No. 10,007,730, issued Jun. 26, 2018, which is incorporated by reference herein in its entirety, as if set forth fully herein.

BACKGROUND

Search engines help people answer consequential questions. However, searchers do not always arrive at correct answers to their questions, despite the existence of information containing the correct answers. Biases in retrieved and indexed content (e.g., skew toward erroneous outcomes), coupled with searchers' biases in how they examine and interpret search results, can lead people to incorrect answers.

SUMMARY

This application describes techniques to detect biases or potential biases in search and retrieval. Such biases may be manifest in the way that a search engine indexes content, the way in which search results are ranked or presented, the way in which users perceive the search results, and/or the way in which users formulate search queries. Any or all of these sources of bias may affect the accuracy or veracity of content in search results. Once bias or potential bias is identified, techniques may be applied to indicate and/or compensate for the bias. Such techniques may allow users to more easily assess the veracity of search results, and increase the chances that users will locate accurate answers to their questions. Additionally, in some examples, the techniques may reduce the number of search results reviewed by a user to arrive at a correct answer, thereby reducing an amount of network traffic associated with the user reviewing the search results.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicates similar or identical items.

FIG. 5B illustrates another example search results page in which search results have been modified by appending an annotation to the search results, the annotation including one or more normative base rates.

DETAILED DESCRIPTION

Overview

Figure 1:
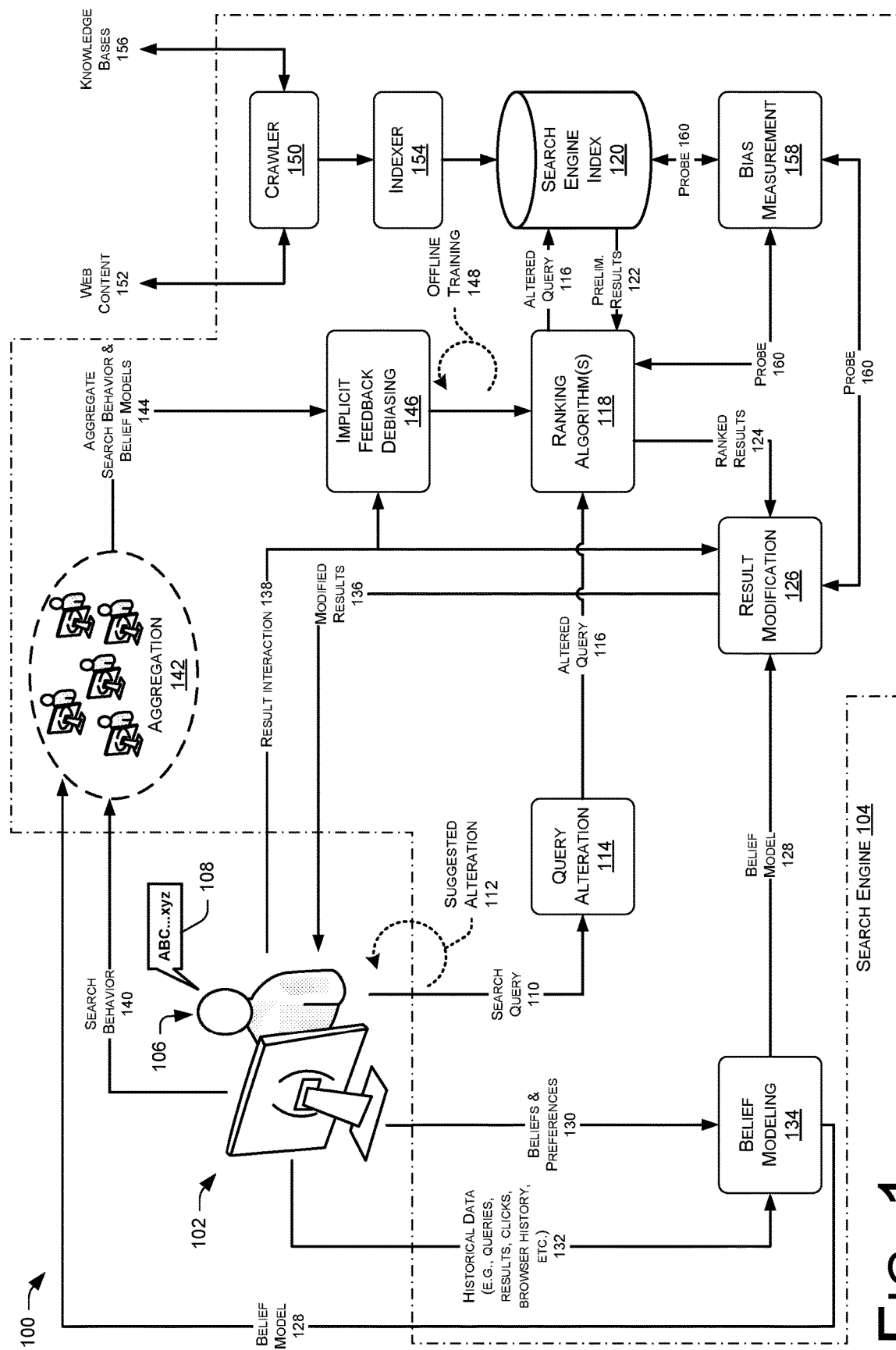
FIG. 1 is a schematic diagram of an example architecture illustrating techniques for detecting, indicating, and/or compensating for bias in search.

As discussed above, biases in retrieved and indexed content, coupled with searchers' biases in how they examine and interpret search results, often lead searchers to incorrect answers to their questions. As used herein, "bias" means a situation where searchers seek or are presented with information that significantly deviates from the truth. "Truth" refers to information that is objectively verifiable and/or for which consensus has been obtained among authorities on the subject. For instance, for searches that are diagnostic (e.g., diagnosing a medical condition, home or auto repair, troubleshooting computer hardware or software, etc.), historical (e.g., recorded history), legal (e.g., relating to a law or regulation), or scientific (chemistry, biology, physics, math, astronomy, geology, etc.) in nature, "truth" refers to a diagnosis, fact, law, or answer that is objectively verifiable and/or for which consensus has been obtained among authorities on the subject. In these instances, bias may be determined by comparison to one or more authoritative sources on the respective subject. By way of example and not limitation, in the case of medical diagnosis, Cochrane Reviews are an example of an authoritative source against which content may be compared to determine bias. As another example, in the case of automotive repair, a service manual of a vehicle manufacturer is an example of an authoritative source against which content may be compared to determine bias. These and numerous other authoritative sources may be used depending on the subject of the search queries.

For searches that are directed to topics, such as political views (as opposed to political history, voting records, or other objectively verifiable information) and religion, that are subject to opinion and/or for which there is no consensus, the concept of "truth" may be relative (e.g., relative to some specified source such as religious text, political party manifesto, or the like) or may be inapplicable. In these instances, bias may be determined by comparison to the specified source, or may be indeterminate.

In the context of information retrieval or search, biases may be manifest in the way that a search engine indexes content, the way in which search results are ranked or presented, and/or the way in which users formulate search queries. Any or all of these sources of bias may affect the accuracy or veracity of content in search results, as well as the searchers' reliance on the search results. A recent study by the inventors of the subject application found that when searching for answers to diagnostic questions using conventional search techniques, users only obtained the correct answer about half the time. These results are significant, considering that people use the answers they obtain from search results to inform consequential decisions, such as self-treatment of medical conditions, repair of homes or vehicles, historical research, and others.

This application begins by describing techniques to detect biases or potential biases in search and retrieval. By observing content in a search engine index, retrieved by the search engine for particular queries, or selected by users, bias may be estimated in a number of ways. For instance, content in the search engine index may be compared with one or more authoritative datasets to determine whether or not the indexed content is representative of the content contained in the authoritative data sets. If not, the search engine crawler/indexer may be updated to crawl additional or alternative data that is more representative of the authoritative data sets. Additionally or alternatively, content in the search engine index may be reviewed by experts in the field (e.g., practicing medical professionals, auto mechanics, etc.). Labels may then be determined for the content (pages, result-page captions, advertisements, etc.). Labels may be determined through crowd sourced human assessments and/or by automatically extracting labels from documents. Presence of particular terms (e.g., alarming terms, colloquial terms, etc.) in result-page captions may be employed. These terms can be used to help explain deviations in aggregate click-through statistics across the top results, where deviations from the expected distributions are noted. This approach may also be leveraged as a means of estimating biases in both search result captions and in search behaviors (e.g., clicks associated with potential anxieties). Additional details and examples of detecting bias in search and retrieval can be found in the following article by the inventors of the subject application: Content Biases in Online Health Search, by R. W. White and A. Hassan, published in ACM Transactions on the Web (TWEB), Volume 8, Issue 4, Article 25, Nov. 6, 2014.

Once bias or potential bias is detected, this application describes techniques that may be applied to indicate and/or compensate for the bias. Such techniques may allow users to more easily assess the veracity of search results, and increase the chances that users will locate accurate answers to their questions. Additionally, providing users with search results that are more accurate and authoritative, will reduce number of search queries submitted and the number of search results reviewed to arrive at an answer, thereby reducing overall network traffic per obtained answer. Furthermore, in some examples, by modifying a crawling strategy, search engines may crawl the web more efficiently. This also will reduce the overall network traffic by capturing more authoritative content and avoiding unnecessarily crawling inaccurate, redundant, and/or unauthoritative content on the web.

In some examples, techniques described herein may be applied to detect and/or compensate for generalized biases of search users in aggregate, without regard to beliefs of individual users. The way in which search results are presented may influence user click through behavior (i.e., which entries of the search results the user reviews and in what order). For instance, user click through behavior tends to be skewed to favor result entries that are presented near the top of the search results, that are phrased in the affirmative (e.g., symptom X is caused by condition Y), and/or that include references to potentially alarming content such as serious medical conditions (e.g., heart attack, stroke, etc.) or extensive or catastrophic diagnoses (engine ceased, hard drive crashed, etc.). Furthermore, content itself may be objectively untrue/inaccurate and, thus, biased. Content from authoritative sources or that uses authoritative terminology (e.g., "treat" or "repair") tends to be more objectively accurate than content from non-authoritative sources or that uses colloquial terms (e.g., "help" or "fix"). Taking into account these generalized biases, modified search results that compensate for the generalized bias(es) may be generated and output for presentation at a client device of the user. For instance, example techniques may include detecting terms (e.g., alarming terms, colloquial terms, etc.) in captions of search result entries that are likely to skew user click-through behavior, and replacing such entries with other entries that have substantively similar content but are free of the detected terms.

In some examples, multiple sets of search results may be obtained using multiple different ranking algorithms. For instance, one ranking algorithm may be used to generate a set of search results that takes into account the veracity of the search results, and another ranking algorithm may disregard veracity of the results. Alternatively, one ranking algorithm may weight popularity of results more heavily than veracity of the results, and another ranking algorithm may weight veracity of results more heavily than popularity of the results. The multiple sets of search results may be output for presentation concurrently or sequentially at a client device of the user.

In some examples, techniques may include obtaining search results responsive to a search query, and detecting one or more potentially biased entries from among the multiple entries of the search results. The search results may be annotated with an indication of the potentially biased entries. In some examples, the indication may include a visual indicator presented in association with each of the one or more potentially biased entries. In some examples, the indication may include one or more normative base rates indicating a likelihood of a condition given one or more symptoms. The search results may be output for presentation at a client device of the user along with the indication of the potentially biased entries. In this way, users may be made aware of potentially biased entries and may take into account the potential bias when deciding which entries of the search results to review and/or when answering a question related to the query.

The techniques described herein may be implemented in whole or in part by one or more search engine servers. In some examples, certain techniques (or portions thereof) may be implemented at a client device of a user performing a search and/or by another computing device (e.g., an intermediary web service). By way of example and not limitation, illustrative systems and devices suitable for implementing the techniques are described below with reference to the figures.

Example Architecture

FIG. 1 is a schematic diagram of an example architecture 100 that introduces illustrates techniques for detecting, indicating, and/or compensating for bias in search. While FIG. 1 illustrates an example in which multiple different techniques used together, in other examples the various techniques may be used individually and/or in different combinations. Additional details of individual operations illustrated in FIG. 1 are described in more detail with reference to subsequent figures.

The architecture 100 includes a client device 102 (sometimes referred to as a "computing device 102") which is in communication with a search engine 104. As shown, a user 106 is performing a search via the client device 102. The user 106 has one or more beliefs and biases 108. These beliefs and biases 108 may be common among users, or may be unique to the particular user. A user's beliefs influence how they formulate their search queries (e.g., how they frame search queries, the terms they use in search queries, etc.). For example, people typically frame questions positively/affirmatively (e.g., "Can acid reflux cause back pain?" and not "Is acid reflux unrelated to back pain?"). This framing can reveal something about their preconceptions, but can also skew search engines if people also phrase their search queries positively. As an example, ranking methods may consider a result with a yes-oriented answer (e.g., "Acid reflux can cause back pain") to be more similar to the query than a no-oriented answer (e.g., "Acid reflux cannot cause back pain"). Thus, the framing of search queries can significantly impact search results returned, so any bias in the search queries will likely lead to a bias in the retrieved results.

Along with the framing, the terms used in the search query also dictate the results that will be returned. Certain terms are more likely to result in accurate information than others. Thus, the choice of terms used in the search query affects the accuracy of the search results. This is true even for synonyms or near synonyms. This is also related to the nature of the document (e.g., authoritative results are more likely to use the term "treat" rather than "help"). Thus, accuracy of search results may be improved and bias may be minimized by improving the search query upon which the search is performed.

FIG. 1 illustrates an example in which the user 106 enters a search query 110 via an interface of a web page, browser, operating system or application of the client device 102. The search query 110 may be composed of multiple terms (e.g., "Can tea tree oil help athlete's foot?"). This search query 110 will produce a set of search results which is likely to be skewed in favor of affirmative results (since the search query was framed in the affirmative). Also, certain terms used in the query (e.g., "can" and "help") are colloquial and tend to be associated with results that are less authoritative. Thus, the results based on this query 110 may not be accurate and, therefore, may be biased.

FIG. 1 illustrates several example techniques that may be used to alter the search query to improve accuracy of search results. In a first example, at 112, the search engine 104 or the client device 102 may provide suggested alterations to the query to improve the accuracy of search results, which the user may accept or reject. The suggested alterations 112 may be provided in the form of substitute term suggestions (e.g., use "does" instead of "can" and "treat" instead of "help" to obtain more authoritative results). In that case, a list of substitute terms may be maintained in memory of the search engine 104, the client device 102, or both, and may be updated over time to include additional or alternative terms. Additionally or alternatively, suggested alterations 112 may be provided in the form of questions to help the user refine the search query (e.g., "Do you want to know if tea tree oil is an effective treatment for athletes' foot?"). In that case, machine learning techniques may be employed to discern the user's intent and to feedback the reformulated query to the user for confirmation. Additionally or alternatively, at block 114, the search engine 104 or the client device 102 may employ "backend" query alterations (hidden from the searcher) to replace terms that could introduce skew into the results, such as "can" and help," with synonyms such as "does" and "treat." The output of the suggested alteration 112 and the backend query alteration 114 is an altered query 116. The suggested alteration 112 and/or the backend query alteration 114 may be updated over time using machine learning to optimize the query suggestions/alterations based on individual and/or aggregate search behaviors responsive to receiving results based on the altered search query 116.

The altered query 116 is then provided as an input to one or more ranking algorithms 118. The altered query 116 may also be provided to a search engine index 120, which may return results 122 based on the altered query 116. In other examples, the suggested alteration 112 and query alteration 114 may be omitted, in which case the original search query 110 may be provided to the ranking algorithm(s) 118 and search engine index 120.

The ranking algorithm(s) 118 may include multiple ranking algorithms that take into account different factors and/or weight different factors differently. For instance, some ranking algorithms focus on satisfying searcher desires (validation) versus providing them with a correct answer (veracity). Ranking algorithms that focus on validation may weight popularity of search results more heavily than veracity of search results, or may ignore veracity of the search results entirely. The search engine 104 may determine which of the ranking algorithm(s) 118 to use to rank results 120. This determination may be made globally for all queries (e.g., always prefer veracity), based on the subject matter (e.g., favor veracity for certain topics such as healthcare, or those where there is a known and accepted truth, but for more controversial topics such as politics or religion prefer validation since there is no clear truth), or based on user models reflecting individual user preferences (e.g., searchers may want their beliefs to be validated, irrespective of factual correctness). The selected ranking algorithm(s) 118 are used to obtain ranked results 124. In some examples, the search engine 104 may apply multiple ranking algorithms 118 to obtain multiple sets of ranked results 124.

In some examples, the ranked results 124 may be transmitted to the client device 102 for presentation to the user without further modification. Additionally or alternatively, the ranked search results 124 may be further modified, at a result modification operation 126, prior to being output to the client device 102 for presentation to the user 106. The result modification operation 126 may include modifications to indicate and/or compensate for generalized bias of aggregate users and/or to compensate for individualized bias of individual users.

In the case of generalized bias of aggregate users, the result modification operation 126 may include replacing a search result entry having a first term (e.g., a term previously determined to be "alarming" or "colloquial") in the caption with another entry having substantively similar content but having a caption that is free of the first term. The replacement caption may, for example, use a second term, which has previously been determined to be authoritative, instead of the first term.

Additionally or alternatively, the result modification 126 may include appending an annotation to the search results indicating that one or more entries of the ranked search results 124 are potentially biased. In some examples, in which the search query relates to diagnosing a condition, the annotation may include one or more normative base rates, which indicate a likelihood of the condition given one or more symptoms. These annotations of potentially-inaccurate or potentially biased content, may be helpful to the user in guiding both search interaction decisions and real world decisions more generally. In some examples, the annotations may be presented interactively (e.g., as interactive controls presented on a graphical user interface of the search results page), allowing users to select the controls to gain additional information (e.g., a description of why the entry was flagged as being potentially biased, suggestions for how to obtain more authoritative information, etc.). In examples in which the annotations include normative base rates, the controls may allow the user to provide additional information about the symptoms they are experiencing (e.g., by selection of one of the listed symptoms or by inputting text via a text box) to refine the search and/or allow the user to select one or more symptoms to obtain lists of other conditions that also result in the selected symptom(s). As discussed further below, such techniques can also be used to collect information about the preferences of users that can be useful in refining their queries and in constructing long-term models of their beliefs for use in personalizing the search experience.

Additionally or alternatively, the result modification 126 may include determining a potential bias of each entry of the ranked results 124, and reordering the ranked results 124 based on the potential bias to present entries having least potential bias first.

In the case of individualized bias, the result modification 126 may take into account a belief model 128 of the user, which comprises information about the user's beliefs 108 and preferences, and may be used to determine and potentially compensate for the user's biases. Because beliefs are highly personal, user consent may be obtained prior to collecting user belief information. The consent may be obtained by presenting a notification to the user allowing the user to opt-in or -out of the belief modeling service. Alternatively, depending on the information to be collected, in some instances user consent may be obtained as part of the terms and conditions for use of the web site, browser, operating system, or application through which the user accesses the search engine 104.

The belief model 128 may be generated and refined based on explicit beliefs and/or preferences 130 provided by the user (e.g., in response to questions, prompts, settings, or other information presented to the user via the client device 102). For instance, the beliefs and preferences 130 may include information collected prior to performing a search, such as when the user 106 registers for, or manages, an account with a service provider that hosts the search engine (e.g., an email account, a social networking account, an e-commerce merchant account, a payment account, etc.). Additionally or alternatively, the beliefs and preferences 130 may include information collected subsequent and/or responsive to the user 106 submitting the search query 110. For instance, beliefs and preferences 130 may include user input received in response to the suggested query alterations 112 (e.g., accepting or rejecting suggested query alterations, responses to questions aimed at refining the search query, etc.). Examples of beliefs and preferences 130 that the user may explicitly provide include registration information (e.g., name, login, password, contact information, etc.), demographic information (e.g., age, gender, address, occupation, education, income, etc.), payment information (e.g., account numbers, financial institutions, etc.), preference information (e.g., shipping preferences, content preferences, interests, etc.), and the like. This information may be provided at the initiative of the user (e.g., in order to take advantage of certain services) and/or may be provided in response to a prompt for the information.

The belief model 128 may additionally or alternatively be based on beliefs inferred from historical data 132, such as historical search queries, search results corresponding to the historical search queries, interaction with the search results (e.g., clicks, order of clicks, hovers, lengths of time that search result entries were viewed, etc.), browser history, purchase history, social networking information (e.g., connections, posts, etc.), etc. The historical data 132 may comprise information stored locally at the client device 102, information related to or obtained by a service provider or entity that administers the search engine 104, or information from one or more other service providers or entities.

The explicit beliefs and preferences 130 and the historical data 132 may be provided to a belief modeling operation 134 to generate the belief model 128 for the user. The belief modeling operation 134 may be performed iteratively over time to optimize the belief model 128 using machine learning techniques.

Using the belief model 128, the result modification operation 126 may model user's degree of belief in one more subjects relevant to the search query and personalize the search results based on the belief. Current approaches to personalization focus on topical matches (e.g., knowledge that a user is interested in content on a particular topic, rather than their degrees of belief in particular outcomes associated with that topic, which can influence behaviors, search satisfaction, and overall search success). By taking into account the user's beliefs, the search engine 104 may modify the ranked results 124 to compensate for biases of the user related to the beliefs. For instance, the result modification 126 may include surfacing content to provide context for the results (e.g., content providing background or foundational information, or content interpreting or elaborating on the search results) or to counter erroneous beliefs (e.g., content refuting or debunking the erroneous belief).

The result modification operation 126, may then output modified results 136 (in addition to or instead of ranked results 124 and/or preliminary results 122) for presentation by the client device 102. As noted above, the modified results 136 may be modified to compensate for generalized biases of aggregate search users, individualized biases of the user 106, or both.

The user 106 may then view the modified results 136 including any annotations (e.g., indications of bias, base rates, etc.). Upon viewing the modified results 136, the user 106 may interact with the modified results 136 in a variety of ways. For instance, the user 106 may scroll through the results, hover a pointer over one or more result titles or captions, click on or otherwise select one or more result entries, or the like. Additionally, the user may interact with the annotations indicating bias of one or more entries and/or indicating normative base rates, as described above. The user's client device (or a browser, operating system, or application thereof) may monitor and collect this result interaction 138 and feed it back to the search engine 104 to optimize the result modification 126 for the user 106. By way of example, the search engine 104 may use the result interaction 138 information to optimize personalization of future search results, update the belief model 128, or the like.

The user's search behavior 140, including the original search query 110, altered query 114, results (modified results 136, ranked results 124, and/or results 122) and/or result interaction 138, may be aggregated with search behavior of other users at an aggregation operation 142. Additionally or alternatively, the user's belief model 128 may be aggregated with belief models of other users at the aggregation operation 142. The aggregation operation 142 may be performed by the search engine 104 and/or by one or more third party services. In the process of the aggregation operation 142, the search behavior and belief model of the user may be de-identified. The aggregate search behavior and belief models 144 may be fed back to an implicit feedback debiasing operation 146 to compensate for generalized bias(es) represented by the aggregate search behavior and belief models 144. The user's interactions with the search results (result interaction 138) may also be fed back to the implicit feedback debiasing operation 146. The interactions from this user 108 with the search results (result interaction 138) and other users (aggregate search behavior and belief models 144) represent combined properties of the search engine results (e.g., the presence of alarming content in captions selected by the users) and their long-term behaviors to better understand the motivations behind the users' clicks. This can be used to de-bias the click information and provide a cleaner signal to the ranking algorithm(s) 118 for offline training 148 when aggregated across many searchers.

Biases may also be manifest in a search engine index due to the way in which content is crawled and/or indexed. Search engines index particular parts of the web. The content that is indexed can be strongly skewed toward particular outcomes (e.g., a lot more written in support of a treatment option than against it). This may be appropriate when the correct answer agrees with the skew, but is problematic when there is a lack of agreement. The skew in crawled and indexed content may reflect aggregated preferences in the nature or source of information that searchers seek, or general availability of the content on the web. Search engines optimize content (including learned rankings and resource selection) for the types of questions that users typically ask rather than normative base rates. In some examples described herein, the search engine 104 may take into account the quality/accuracy of content in crawling and indexing decisions. This may increase accuracy by reducing the strong positive skew in results and index content.

Referring back to FIG. 1, a search engine crawler 150 crawls web content 152, which is indexed by an indexer 154 and stored in the search engine index 120. However, if the crawler 150 is configured to disproportionately crawl inaccurate or unauthoritative content (e.g., content skewed toward particular outcomes), and the indexer 154 indexes that content, then the search engine index 120 will propagate this. By detecting this bias, the crawler 150 can be updated to search additional external knowledge bases 156 containing information about incidence rates and the authoritativeness of the content available. Additionally or alternatively, the crawler 150 may be configured to crawl additional authoritative sources of content and/or to crawl authoritative sources more thoroughly (e.g., to a deeper level of linking). In some instances this may include obtaining subscriptions or license rights to access the additional authoritative content. In some examples, if authoritative content on a particular subject is unavailable, the search engine 104 may commission the creation of new content by an authority on the subject. In addition to modifying the crawler, in some examples, the indexer 154 may be modified to index content differently to compensate for bias. For instance, the index may be modified to index authoritative content more thoroughly (e.g., including a higher density or finer granularity of index entries for authoritative content). Bias can be detected at various stages of the search process. These and other modifications to the crawling and indexing of content may increase the accuracy, and thereby reduce an extent of bias, of search results.

In some examples, a bias measurement operation 158 may be performed by periodic probes 160 of the search engine index 120, ranking algorithm(s) 118 (or the incoming results 122 or outgoing ranked results 124), result modification 126 (or modified results 136), or other operations of the search engine 104.

Example Search System

Figure 2:
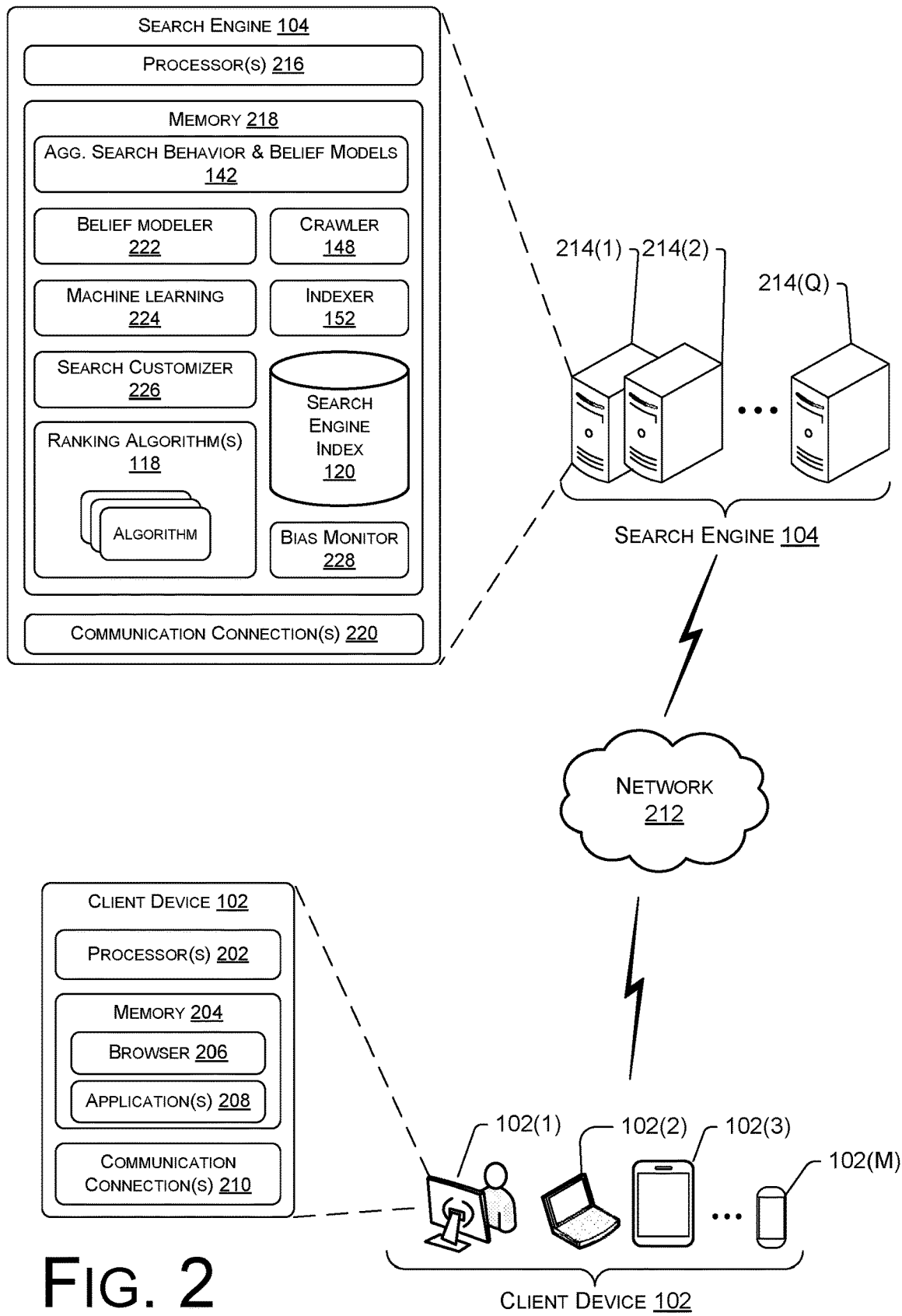
FIG. 2 is a schematic diagram illustrating an example system of devices usable to implement techniques for detecting and/or compensating for bias in search.

FIG. 2 is a schematic diagram illustrating an example system 200 of devices usable to implement techniques for detecting and/or compensating for bias in search. FIG. 1 illustrates a conceptual flow of operations for detecting, indicating, and/or compensating for bias in search, FIG. 2 illustrates additional details of hardware and software components that may be used to implement such techniques. The system 200 is merely one example, and the techniques described herein are not limited to performance using the system 200 of FIG. 2. The system 200 includes the client device 102 and the search engine 104.

In the example of FIG. 2, the client device 102 includes one or more processors 202 and memory 204 communicatively coupled to the processor(s) 202. The client device 102 may be implemented as any type of computing device including, but not limited to, a personal computer, a laptop computer, a tablet computer, a portable digital assistant (PDA), a mobile phone (e.g., a smart phone), an electronic book (e-book) reader, a game console, a set-top box (STB), a smart television (TV), a portable game player, a portable media player, and so forth. FIG. 2 shows representative client devices 102 in the forms of a desktop computer 102(1), a laptop computer 102(2), a tablet 102(3), and a mobile device 102(M). However, these are merely examples and client devices 102 according to this application may take other forms.

The client device 102 may include a browser 206 and one or more applications 208 stored in the memory 204. The client device 102 may also include one or more communication connections 210 by which the client device 102 is able to communicate with other devices over a network 212. The browser 206 may be usable to access one or more search engines, including search engine 104, and other sites (e.g., e-commerce merchants, content providers, social networking sites, etc.) via the communication connections 210 over the network 212. In some examples, the browser 206 may include a search interface (e.g., search box or bar) by which a user can enter a search query via the search interface without navigating to a particular search engine or website.

Examples of the application(s) 208 stored in the memory 204 include an operating system, a virtual assistant (e.g., Siri® available from Apple Inc. of Cupertino Calif. or Cortana® available from Microsoft Corporation of Redmond Wash.), a social networking application, a media player, a game, an email or messaging application, a word processing application, a shopping application, or the like. Some or all of the applications may include search functionality usable to search public and/or private corpuses of documents.

The search engine 104 may be implemented or hosted by one or more servers, server farms, data centers, or other computing devices. In the illustrated example, the search engine 104 is implemented by multiple servers 214(1), 214(2), . . . , 214(Q) (collectively "servers 214"), where Q is any integer greater than or equal to 1. The search engine 104 includes one or more processors 216 communicatively coupled to memory 218. Memory 218 may include one or multiple memory devices. The search engine 104 also includes one or more communication connections 220 by which the search engine 104 is coupled to the network 212. In the illustrated example, the memory 218 stores the aggregate search behavior and belief models 144 collected from multiple searchers over time. As discussed above, the aggregate search behavior may include search and browsing histories of multiple users over time including, for example, search queries and corresponding search results, captions of search results, user interactions with the results (e.g., result clicks, hovers, scrolling, time spent viewing individual results, order in which results are viewed, etc.). The belief models may include information about beliefs and preferences of users gleaned from their individual and/or aggregate search behaviors.

A belief modeler 222 may perform the belief modeling operation 134 to generate the belief model 128 for the user. The belief modeler 222 may employ machine learning 224 to optimize the belief models 128 over time as individual users perform additional searches and interact with the results of such searches. While the machine learning 224 in this example is shown as a separate module, in other examples, machine learning logic may be incorporated in the belief modeler 222.

A search customizer 226 may perform the query alteration 114, result modification 126, and/or implicit feedback debiasing 146. The search customizer 226 may take into account generalized biases of aggregate users and/or individualized biases of a particular user derived from his or her belief model 128, and may customize search results to compensate for such biases. As discussed above, compensation for bias may include, for example, selecting which content to include in the search results, selecting or modifying an order in which to present the search results, presenting annotations indicating potential bias or providing an objective context against which searchers can consider the search results.

The memory 218 also stores the crawler 150, indexer 154, search engine index 120, and ranking algorithm(s) 118, and a bias monitor 228 which performs the bias measurement operations 158. For instance, bias monitor 228 may perform the periodic probes 160 of the search engine index 120, ranking algorithm(s) 118 (or the incoming results 122 or outgoing ranked results 124), result modification 126 (or modified results 136), or other operations of the search engine 104. In the event that the bias monitor 228 identifies bias in one or more components of the search engine 104, the bias monitor 228 may initiate one or more actions to compensate for the bias. For example, if the bias monitor 228 determines that the search engine index 120 contains content that is inaccurate, unauthoritative, is not representative of the truth, and/or omits relevant or authoritative content, the bias monitor 228 may update a crawling strategy to cause the crawler 150 to crawl additional or alternative content to compensate for the bias. Additionally or alternatively, the bias monitor 228 may update an indexing strategy to cause the indexer 154 to index the crawled content differently to compensate for the bias. The bias monitor 228 may leverage the machine learning 224 to optimize the crawling and/or indexing strategies over time based on the aggregate search behavior and belief models 144 for example.

The bias monitor 228 may additionally or alternatively identify bias in one or more of the ranking algorithms 118. The bias monitor 228 may leverage the machine learning 224 to update one or more of the algorithms and/or generate new algorithms in order to compensate for bias. For instance, the ranking algorithm(s) 118 may include an algorithm that takes into account veracity of search results and ranks search results based at least in part on veracity. In some examples, such an algorithm may weight veracity of the results more heavily than popularity of the search results. The veracity of results may be reevaluated and updated over time based on user search behavior and/or comparison to authoritative sources of content. In some examples, the ranking algorithm(s) 118 may include one or more algorithms that are customized for individual users (e.g., a unique, custom algorithm for each user), customized for classes of users (e.g., an algorithm for academic users, an algorithm for medical users, an algorithm for authors, an algorithm for users from a predetermined location, etc.), customized for different query types (e.g., diagnostic queries, opinion based queries, entertainment queries, etc.), or the like.

The processor(s) 202 and 216 may be configured to execute instructions, applications, or programs stored in the memories 204 and 218, respectively. In some examples, the processor(s) 202 and/or 216 may include hardware processors that include, without limitation, a hardware central processing unit (CPU), a graphics processing unit (GPU), a field programmable gate array (FPGA), a complex programmable logic device (CPLD), an application specific integrated circuit (ASIC), a system-on-chip (SoC), or a combination thereof.

The memories 204 and 218 are examples of computer-readable media. Computer-readable media may include two types of computer-readable media, namely computer storage media and communication media. Computer storage media may include volatile and non-volatile, removable, and non-removable media implemented in any method or technology for storage of information, such as computer readable instructions, data structures, program modules, or other data. Computer storage media includes, but is not limited to, random access memory (RAM), read-only memory (ROM), erasable programmable read-only memory (EEPROM), flash memory or other memory technology, compact disc read-only memory (CD-ROM), digital versatile disk (DVD), or other optical storage, magnetic cassettes, magnetic tape, magnetic disk storage or other magnetic storage devices, or any other non-transmission medium that may be used to store the desired information and which may be accessed by a computing device, such as client device 102 or servers 214. In general, computer storage media may include computer-executable instructions that, when executed by one or more processors, cause various functions and/or operations described herein to be performed.

In contrast, communication media embody computer-readable instructions, data structures, program modules, or other data in a modulated data signal, such as a carrier wave, or other transmission mechanism. As defined herein, computer storage media does not include communication media.

Additionally, the communications connection(s) 210 and 220 include physical and/or logical interfaces for connecting the respective computing device(s) to another computing device or a network. For example, the communications connection(s) 210 and 220 may enable WiFi-based communication such as via frequencies defined by the IEEE 802.11 standards, short range wireless frequencies such as Bluetooth®, or any suitable wired or wireless communications protocol that enables the respective computing device to interface with the other computing devices.

The architectures, systems, and individual elements described herein may include many other logical, programmatic, and physical components, of which those shown in the accompanying figures are merely examples that are related to the discussion herein.

Example Query Modification

Figure 3A:
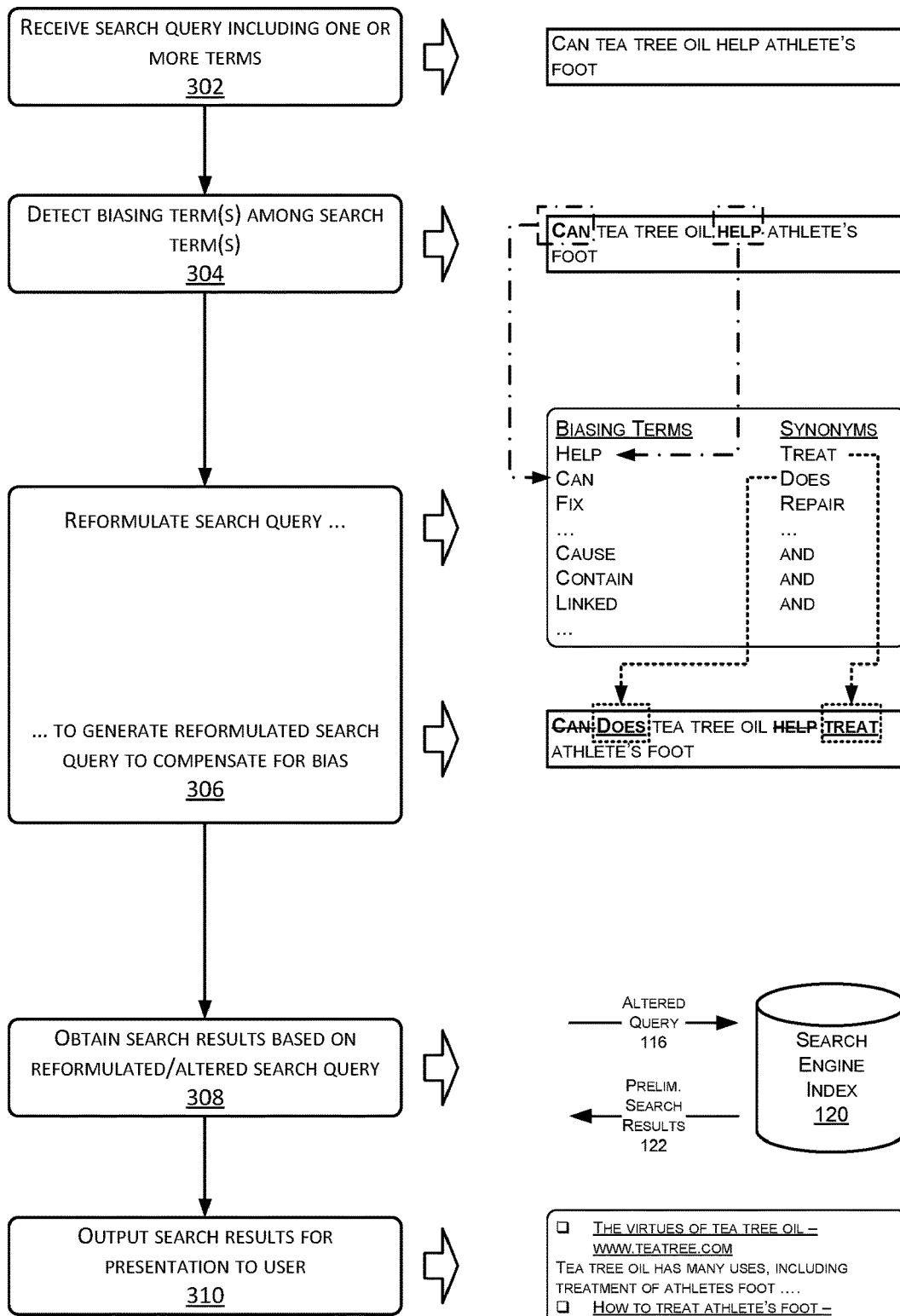
FIG. 3A and FIG. 3B are flow diagrams of example process of reformulating a search query to compensate for bias.
Figure 3B:
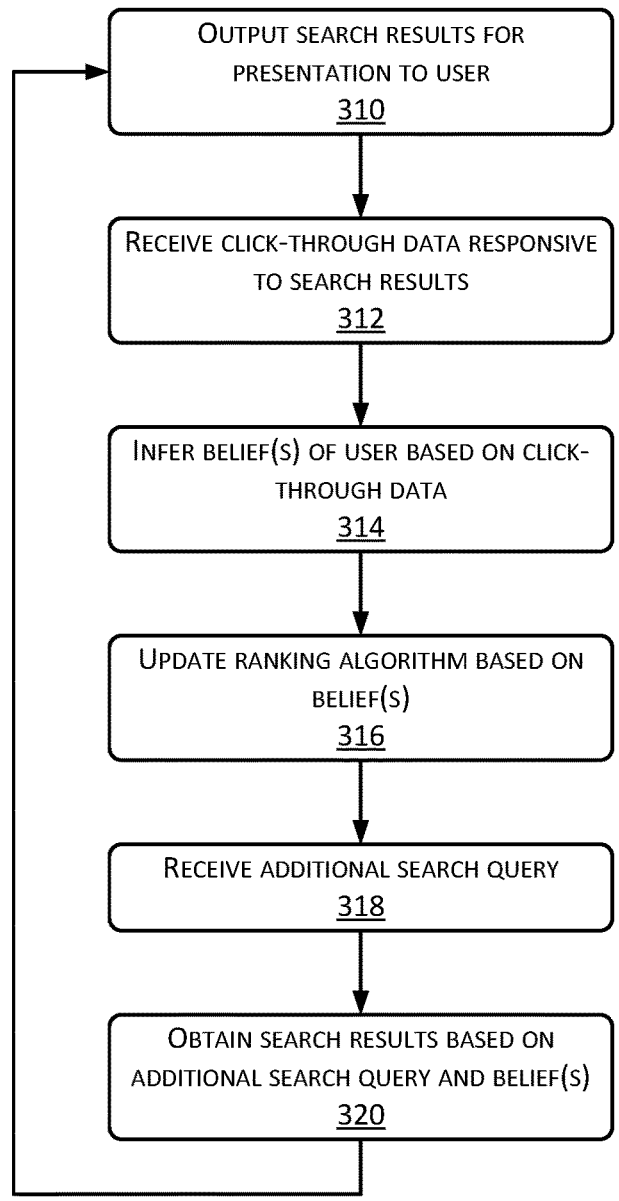

FIG. 3A and FIG. 3B are flow diagrams of example process 300 of reformulating a search query to compensate for bias. The process 300 may be performed as a backend query reformulation by a computing device such as a search engine (e.g., search engine 104), as a local query reformulation by a client device (e.g., client device 102), or by a combination of backend and local operations.

When performing a search, a user (e.g., user 106) inputs a search query via a search box. In some examples, the user may access the search box by navigating to a search engine web site (e.g., Bing®, Google®, Yahoo! ®, etc.) or another web site having search functionality (e.g., a social networking site, application store, micro blogging site, e-commerce merchant website, etc.). In other examples, the search box may be included as part of a browser (e.g., interface, toolbar, menu, add-on, plug-in or the like).

As shown in FIG. 3A, at operation 302, the computing device (e.g., search engine 104 or client device 102) receives the search query. The search query includes one or more search terms that were input by the user. The search terms may comprise textual search terms, images, or audio search terms, and may have been input by the use using a keyboard or other text input device, a camera or other image capture device, or a microphone or other audio input device, respectively.

At operation 304, the computing device detects one or more biasing terms from among the one or more search terms. The biasing terms are terms that have previously been determined to bias search results. Whether or not particular are biasing terms may be determined in a variety of ways. In one example, biasing terms may be determined empirically by inputting a candidate term, obtaining search results for the candidate term, and comparing content of the obtained results to see if the content is accurate (i.e., does not significantly deviate from the truth). In this example, the accuracy of the content may be determined by comparison to one or more authoritative sources (e.g., Cocheran Reviews in the example of medical diagnosis) and/or by review by one or more authorities on a subject (e.g., medical experts or practitioners, continuing the example of medical diagnosis). If a predetermined portion of the search results (e.g., 25%, 33%, a majority, 66%, etc.) and/or if j of the top k search results (e.g., 2 of the top 3, 3 of the top 5, 7 of the top 10, etc.) are accurate, then the candidate term may be determined not to be a biasing term. In this example, j is the number of accurate results out of a set of k top search results, where k is greater than or equal to j. In contrast, if the predetermined portion of the search results are not accurate and/or if j of the top k results are not accurate, then the candidate term may be determined to be a biasing term. For each biasing term, one or more synonyms may be determined. Synonyms may be determined, for example, using a thesaurus, based on analysis of similar search queries, or the like. A list of biasing terms and their synonyms may be generated and updated over time using machine learning (e.g., machine learning 224) and stored in memory of the computing device (e.g., memory 218 and/or 204).

At operation 306, the computing device alters or reformulates the search query to generate a reformulated search query designed to compensate for bias. In some examples, the query may be reformulated automatically by substituting the biasing term(s) with synonyms (that are non-biasing) from the list of biasing terms and their synonyms stored in memory of the computing device. In some examples, refor-
mulating the search query may comprise replacing colloquial terms with terms having substantially same meanings as the colloquial terms but previously having been determined to be more authoritative than the colloquial terms. For instance, the computing device may replace the term "help" (a colloquial term previously determined to result in inaccurate and/or unauthoritative results) with the term "treat" (previously determined to return more authoritative results than the term "help"). In some examples, reformulating the search query may comprise replacing affirmatively skewed terms (i.e., terms that imply an affirmative relationship between other terms in the search query) with neutral terms (i.e., terms that do not imply an affirmative relationship between the other terms in the search query). For instance, the computing device may replace the term "cause" (which implies an affirmative or causal linkage between terms) with "and" (which implies no such linkage). In some examples, reformulating the search query may comprise replacing equivocal terms with unequivocal terms. For instance, the computing device may replace the terms "can" and "may" (which are equivocal) with "does" (which is unequivocal).

At operation 308, the computing device may obtain search results based at least in part on the reformulated/altered search query and, at operation 310, outputs the results for presentation to the user. In the case where query reformulation is a backend operation performed by the search engine, obtaining the search results comprises referencing a search engine index to obtain results and ordering the results using a ranking algorithm stored in the memory of the search engine. Outputting the search results for presentation to the user in such an example comprises transmitting the search results via communication connections to the client device for presentation of the search results on a display of the client device. In the case where the query reformulation is a client side operation performed by the user's client device, obtaining the search results comprises transmitting the reformulated search query to a remote search engine to perform a search based on the reformulated search query, and receiving the search results from the remote search engine. In such an example, outputting the search results for presentation to the user comprises displaying the search results on a display of the client computing device.

FIG. 3B illustrates operations following output of the search results for presentation to the user. Upon being presented with the search results, the user may interact with the search results. For instance, the user may scroll through the search results, may hover a pointer or other selection device over a search result, click on one or more of the search results to view the respective search results, or the like. The search engine (or client device) may monitor and collect this search behavior (with user permission) and use it (alone or aggregated with other user search behavior) to refine various aspects of the search process, such as query reformulation, search result ranking, search result selection, or the like.

As shown in FIG. 3B, at operation 312, the computing device receives click-through data input by the user responsive to the search results. From this click-through data, the computing device may, at operation 314, infer one or more beliefs of the user. The beliefs may be inferred based on the click-through data with or without reference to a belief model of the user (e.g., belief model 128). At operation 316, the computing device may update a ranking algorithm, crawler, indexer, and/or index of the search engine based on the one or more beliefs of the user. For instance, the computing device may update the ranking algorithm to weight results differently and/or present results in a different order in order to compensate for bias apparent from the beliefs of the user.

Subsequently, the user may input an additional search query, which the computing device receives at operation 318. At operation 320, the computing device may obtain search results based on the additional search query and the one or more beliefs of the user. These search results may be output, at operation 310, for presentation to the user.

Figure 3C:
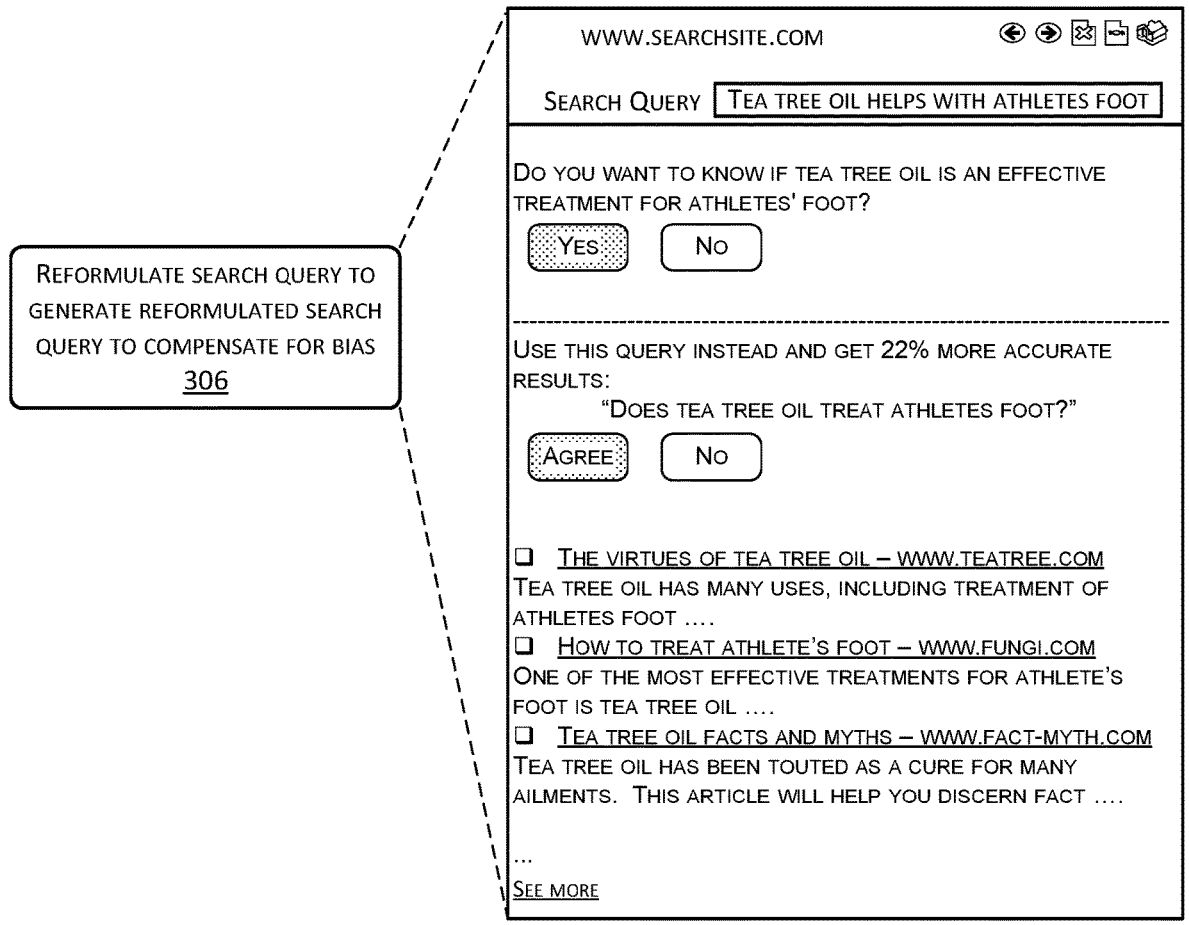
FIG. 3C is a schematic diagram illustrating another technique for reformulating a search query that takes into account user input in reformulating search queries.

FIG. 3A and FIG. 3B describe an example process of automatic query reformulation. FIG. 3C illustrates another technique for reformulating a search query that takes into account user input in reformulating search queries. As shown in this example, the operation 306 of reformulating the search query includes presenting a user interface 322 suggesting alterations to the query to improve the accuracy of search results, which the user may accept or reject. The suggestions may be based on the search query terms input by the user, search behavior of other users (e.g., queries, results, and interactions with results), previous search behaviors of the user, a belief model of the user, and the like. If the user accepts the suggested alterations, the computing device may reformulate the query based on the user acceptance of the suggested query alteration. In the illustrated example, the suggestions take the form of questions to help the user refine the search query (e.g., "Do you want to know if tea tree oil is an effective treatment for athletes' foot?"). However, in other examples, the suggestions may be provided in the form of substitute term suggestions (e.g., use "does" instead of "can" and "treat" instead of "help" to obtain more authoritative results). In some examples, the suggestions may include an explanation of why the query suggestion is being provided (e.g., to increase get accuracy of results) and/or an estimated improvement by adoption of the suggested query alteration (e.g., a percentage improvement in accuracy, reduction in bias, etc.).

Example Bias Detection and/or Compensation of Generalized Bias

Figure 4:
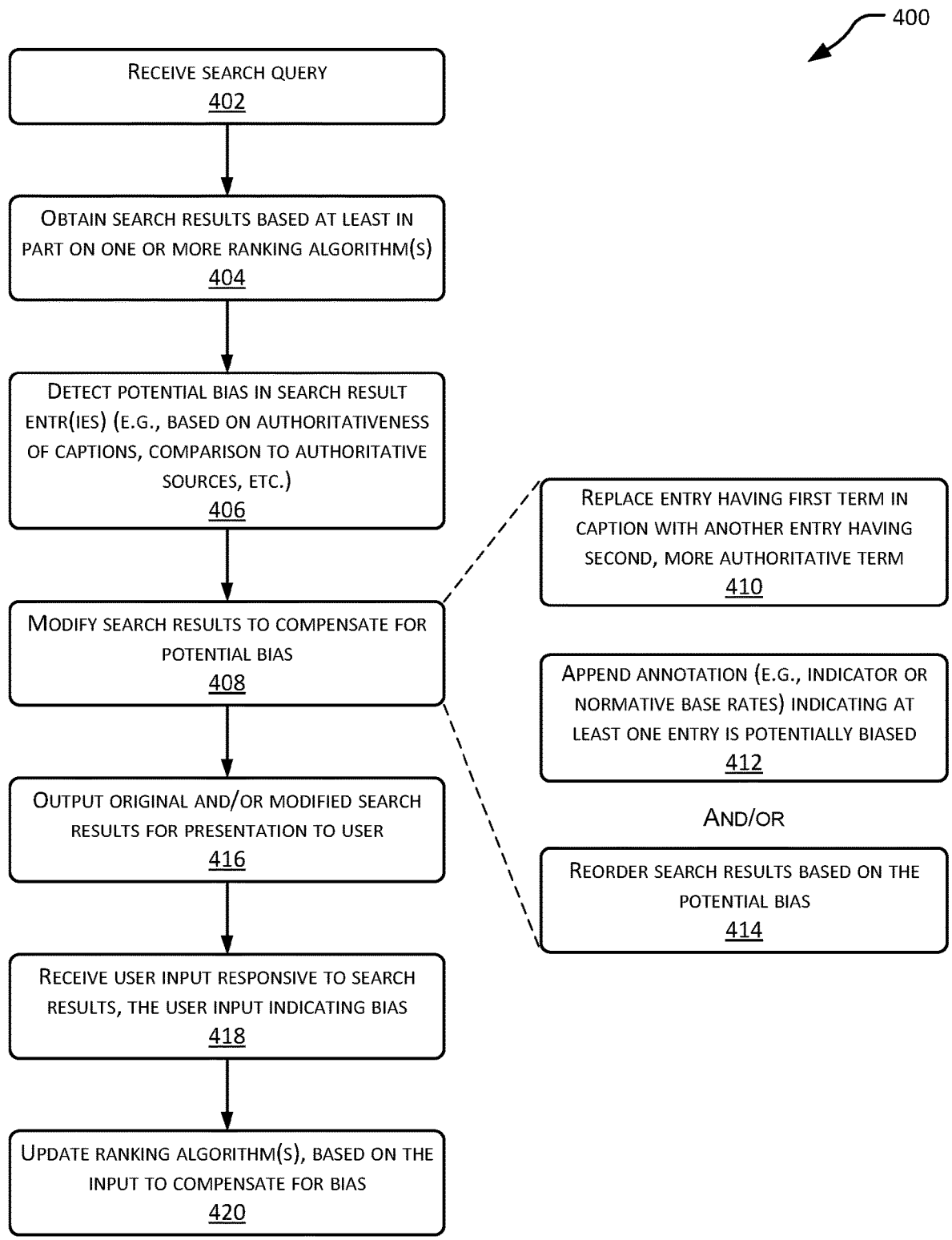
FIG. 4 is a flow diagram of an example process usable to detect and/or compensate for generalized bias.

FIG. 4 is a flow diagram of an example process 400 usable to detect and/or compensate for generalized bias. The process 400 may be performed by a computing device, such as a search engine (e.g., search engine 104) or other website or service.

At operation 402, the computing device receives a search query from a client device via one or more communication connections (e.g., communication connections 220). Responsive to the search query, at operation 404, the computing device obtains search results based on one or more ranking algorithms. The search results may include multiple entries. Each entry corresponds to a web page, document, or other content source. At operation 406, the computing device detects potential bias in one or more of the search result entries. The potential bias may be detected in a variety of ways. In some examples, the bias may be detected based on terms used in captions of the search result entries. For instance, bias may be detected based on authoritativeness (or lack thereof) of captions of the entries, or based on the use of alarming terms in the captions of the entries. Additionally or alternatively, bias may be detected based upon content of the underlying web pages, documents, or other content sources to which the respective search result entries correspond. For instance, the computing device may compare content of each of the entries of the search to one or more authoritative sources (e.g., Cochrane reviews, Physicians' Desk Reference, Manufacturer Service Manual, etc.) and may identify entries that differ substantively from the one or more authoritative sources as being potentially biased entries.

At operation 408, the computing device modifies the search results to generate modified search results that at least partially compensate for the potential bias in the at least one entry. The modifications to the search results may include, for example, those discussed above with respect to the ranking algorithm(s) 118 and/or the result modification operation 126 in FIG. 1. Moreover, in some examples, the result modification may be performed at least in part by the search customizer 226 illustrated in FIG. 2. There are many ways in which search results can be modified to compensate for bias. For instance, the computing device may, at operation 410, replace an entry that includes a first term in the caption with another entry which has substantively similar content to the entry and has a caption that includes a second term which has previously been determined to be more likely to be associated with authoritative content than the first term. Additionally or alternatively, modifying the search results may include, at operation 412, appending an annotation to the search results with an indication of the one or more potentially biased entries. As discussed in further detail below, the annotation may take the form of a flag or visual indicator (see e.g., FIG. 5A) presented in association with each of the one or more potentially biased entries. Each visual indicator may include a confidence level that the entry is biased (e.g., 70% chance the entry is biased) and/or a degree of bias for the entry (e.g., this entry is moderately biased). In examples in which a search query relates to diagnosing a condition, the annotation may take the form of one or more normative base rates (see e.g., FIG. 5B), which indicate a likelihood of the condition given one or more symptoms. Additionally or alternatively, modifying the search results may comprise, at operation 414, reordering the search results based on the potential bias. For instance, the computing device may rank the obtained search results based on potential bias (e.g., by ranking algorithms 118), and modify the search results based on the potential bias (e.g., by reordering the search results to present entries having least potential bias earlier in the modified search results). These and other modifications of the search results are possible to compensate for bias or potential bias of the search results.

At operation 416, the computing device outputs the modified search results via the one or more communication connections for presentation at the client device. Additionally or alternatively, the computing device may output search results obtained responsive to the search query, without modification, for presentation at the client device. Additional details of example techniques for presenting modified and/or original search results are provided below with reference to FIG. 6A-FIG. 6D.

After outputting the results (modified and/or original) for presentation to the user, at operating 418, the computing device may receive user input (e.g., click-through data, views, etc.) responsive to the search results. The computing device may examine the user input to determine whether the user input indicates any bias in the modified search results. For instance, if the user quickly scrolled down and selected the third search result, the computing device may attempt to determine why the user selected the third search result and what actions the user took after selecting the third search result. In doing so, the computing device may determine whether a caption of the third search result included any terms or images that were unique to the third result (i.e., were not included in the captions of other entries of the search results). If so, the computing device may determine whether the unique term(s) or images are associated with accurate/authoritative results (e.g., by comparison to one or more authoritative sources). If not, the computing device may, at operation 420, update the ranking algorithms to account for potential bias in the search result in future searches. For instance, the computing device may down sample the potentially biased search result so that will appear later in future search results.

Additionally or alternatively, the computing device may identify the term/image as a potentially biasing term/image and may store the term/image in a list of potentially biased terms in memory. Additionally or alternatively, the computing device may update a belief model for the user to indicate that the user holds a particular belief about the term/image. Additionally or alternatively, the computing device may determine whether the user's search actions were escalated based upon viewing the third result. If so, then the computing device may determine that the unique term/image may be an alarming term and may store the term as such in memory.

Example Annotation of Potential Bias

Figure 5A:
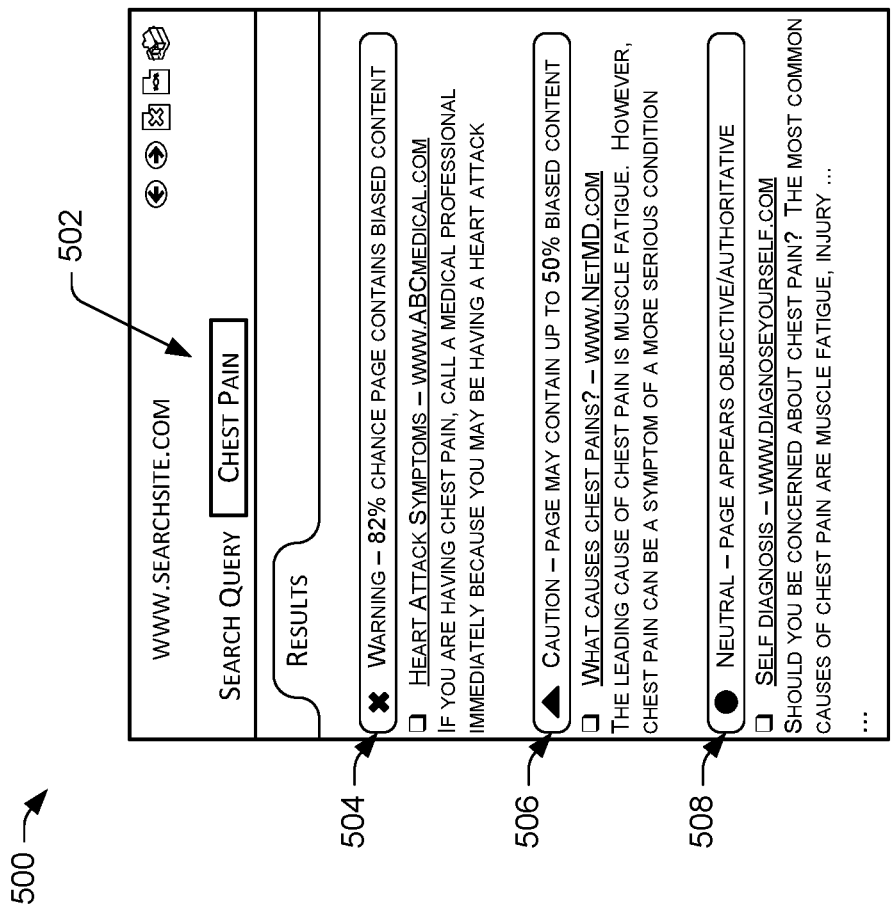
FIG. 5A illustrates an example search results page in which search results have been modified by annotating the entries with a visual indicator of potential bias.

As discussed above with reference to operation 412, in some examples search results may be modified by appending an annotation indicating that one or more entries of the search results are potentially biased. FIGS. 5A and 5B illustrate example annotations of search results to indicate potential bias.

FIG. 5A illustrates an example search results page 500 in which search results have been modified by annotating the entries with a visual indicator of potential bias. For instance, in the illustrated example, a user submitted a search query 502 of "chest pain" via a search box of a website www.searchsite.com. The search query was submitted and the website returned search results including three entries 504, 506, and 508. A visual indicator is presented in association with each of the one or more potentially biased entries. In this example, the visual indicator for each entry includes a symbol indicating a degree of bias and a textual description of the potential bias. For instance, entry 504 includes an example visual indicator denoted by symbol "X" (indicating a "warning" of potential bias) and a textual description describing a likelihood or confidence level that the content corresponding to the entry is biased (e.g., "82% chance page contains biased content"). Entry 506 includes an example visual indicator denoted by a triangle symbol (indicating a "caution" of potential bias) and a textual description describing a degree or extent of bias the corresponding content is likely to have (e.g., "page may contain up to 50% biased content"). Entry 508 includes an example visual indicator denoted by a circle symbol (indicating a "neutral" rating) and a textual description describing why the corresponding content received a neutral rating (e.g., because the "page appears objective/authoritative").

FIG. 5B illustrates another example search results page 510 in which search results have been modified by appending an annotation to the search results, the annotation including one or more normative base rates 512. In this example, the computing device may determine that the query, "chest pain," corresponds to a diagnostic query. In response to determining that the query is a diagnostic query, the computing device may annotate the search results with one or more normative base rates, which indicate a likelihood of a condition given one or more symptoms. In the illustrated example, the normative base rates include a list of conditions (e.g., muscle fatigue, injury, indigestion, heart attack, and other) and their respective likelihoods given the symptom of "chest pain." The normative base rates may be based on an authoritative source of statistics related to the subject of diagnosis. The normative base rates provide an indication to the user that certain entries of the search results may be biased. That is, by informing the user of the objective likelihood of certain conditions, the user is able to determine that results that relate to a very unlikely condition are likely biased (are inaccurate and/or are not representative of the most likely conditions).

Example Presentation of Multiple Search Results

As discussed above, in some examples multiple sets of search results (e.g., modified search results that compensate for bias and original search results that do not) may be output for presentation to the user at a client device. The two sets of search results may be output concurrently (blended or separately) or sequentially (e.g., the user may toggle between them).

Figure 6A:
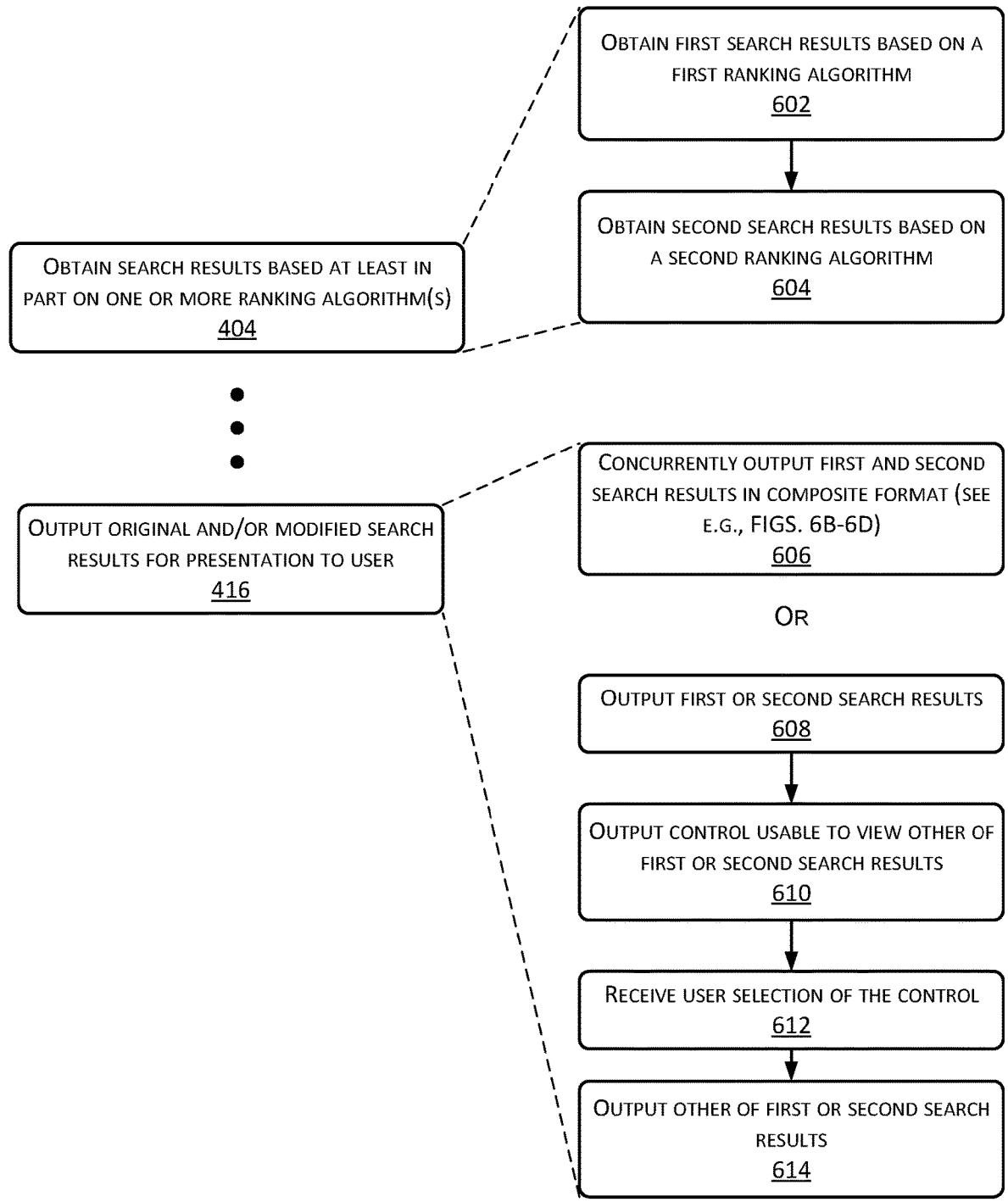
FIG. 6A is a flow chart showing examples of various operations of the process shown in FIG. 4.

FIGS. 6A-6D illustrate additional details of process 400, including example techniques for obtaining search results (operation 404) and outputting search results (operation 416). As shown in the example of FIG. 6A, obtaining search results (operation 404) includes, at operation 602, obtaining first search results responsive to a search query based at least in part on a first ranking algorithm and, at operation 604, obtaining second search results responsive to the search query based at least in part on a second ranking algorithm. The second ranking algorithm in this example is different from the first ranking algorithm. In some examples, either the first ranking algorithm or second ranking algorithm takes into account veracity of the search results, and the other of the first ranking algorithm or the second ranking algorithm does not. In other examples, one of the first ranking algorithm or the second ranking algorithm may weight popularity of results more heavily than veracity of the results, and the other of the first ranking algorithm or the second ranking algorithm may weight veracity of results more heavily than popularity of the results.

Process 400 then may proceed through the other operations outlined with reference to FIG. 4, or may skip to operation 416 to output results. In either case, as shown in example FIG. 6A, outputting search results (operation 416) may include, at operation 606, concurrently outputting both the first search results and the second search results in a composite format for presentation concurrently. The composite format may include two separate, discrete sets of results for concurrent display (as shown in FIG. 6B), two or more discrete sets of results for sequential display (as shown in FIG. 6C), or a blended format in which entries of the first set of search results are interleaved with entries of the second set of search results (as shown in FIG. 6D).

Alternatively, the computing device (e.g., search engine) may output first and second sets of search results sequentially upon request of the user. In that case, outputting the search results (operation 416) may include, at operation 608, outputting one of the first or second sets of search results and, at operation 610, outputting a control usable to view the other of the first and second search results. The control may be output for presentation along with the first or second set of search results. At operation 612, the computing device may receive user input from a client device of the user indicating selection of the control. Responsive to receipt of the user input, the computing device may, at operation 614, output the other of the first or second search results for presentation at the client device. In this way, the search engine may allow the user to toggle between the first and second sets of search results. While two sets of search results are described in the preceding examples, in other examples three or more sets of search results may be obtained and output for presentation.

Figure 6B:
FIG. 6B a schematic diagram illustrating an example user interface displaying a composite format of two separate, discrete sets of search results concurrently.

FIG. 6B is a user interface 616 illustrating an example composite format in which multiple discrete sets of search results are configured for concurrent display. Specifically, a first set of search results 618 is presented in a top portion of the user interface 616, and a second set of search results 620 are presented in a bottom portion of the user interface 616. The first and second sets of search results each include a "see more" control usable to view additional results from the respective set. By selecting the "see more" control for the first set of search results 618, the first set of results will be expanded to show additional results and the second set of results may be collapsed, and vice versa. In this example, the first set of search results 618 comprises a set of "original results" which are obtained according to a traditional, popularity based ranking algorithm and are unmodified, and the second set of search results 620 in this example comprises a set of "modified results" which are obtained using a ranking algorithm that takes into account veracity of the results and/or compensates for bias. However, in other examples, the first and second search results may be obtained in other ways and/or using different ranking algorithms.

Figure 6C:
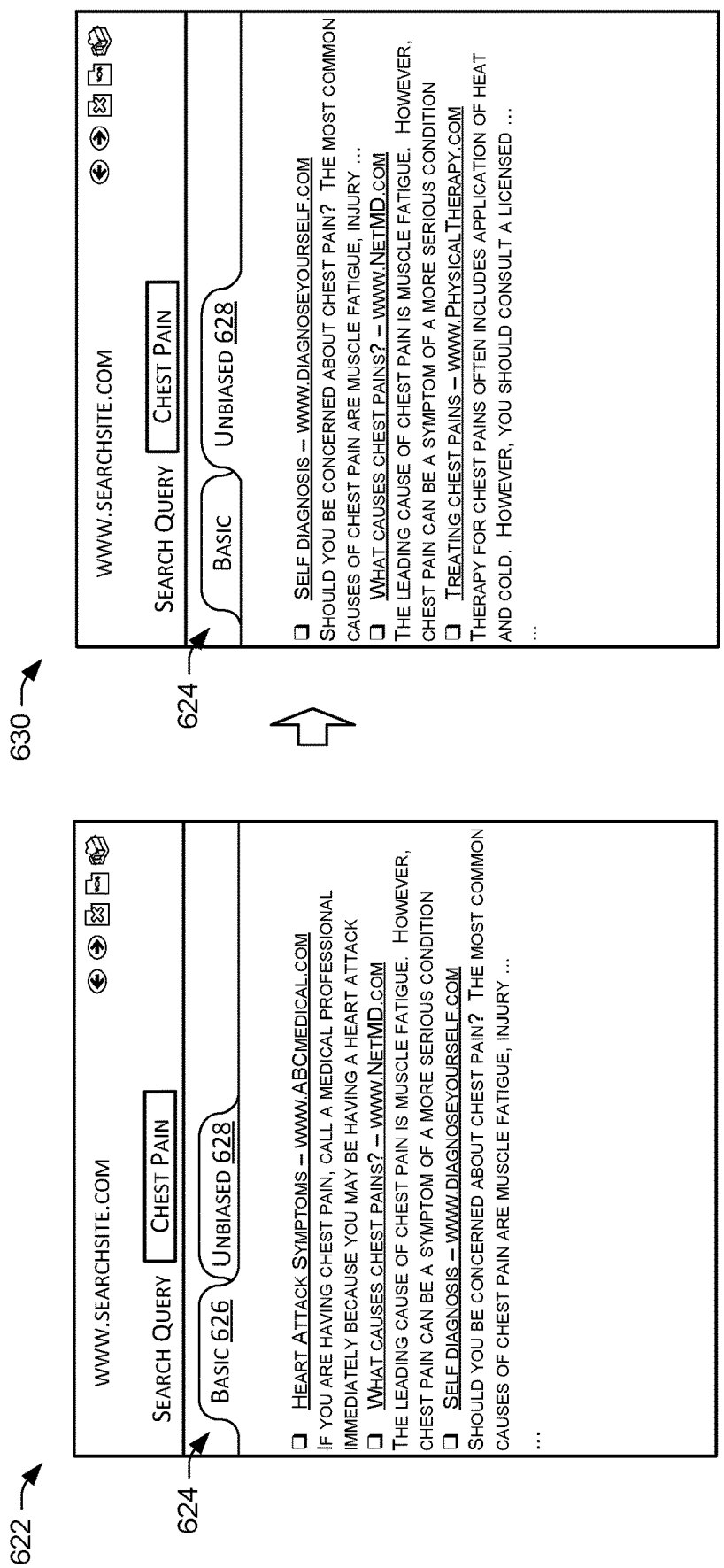
FIG. 6C a schematic diagram illustrating an example user interface displaying a composite format of two separate, discrete sets of search results sequentially.
Figure 6D:
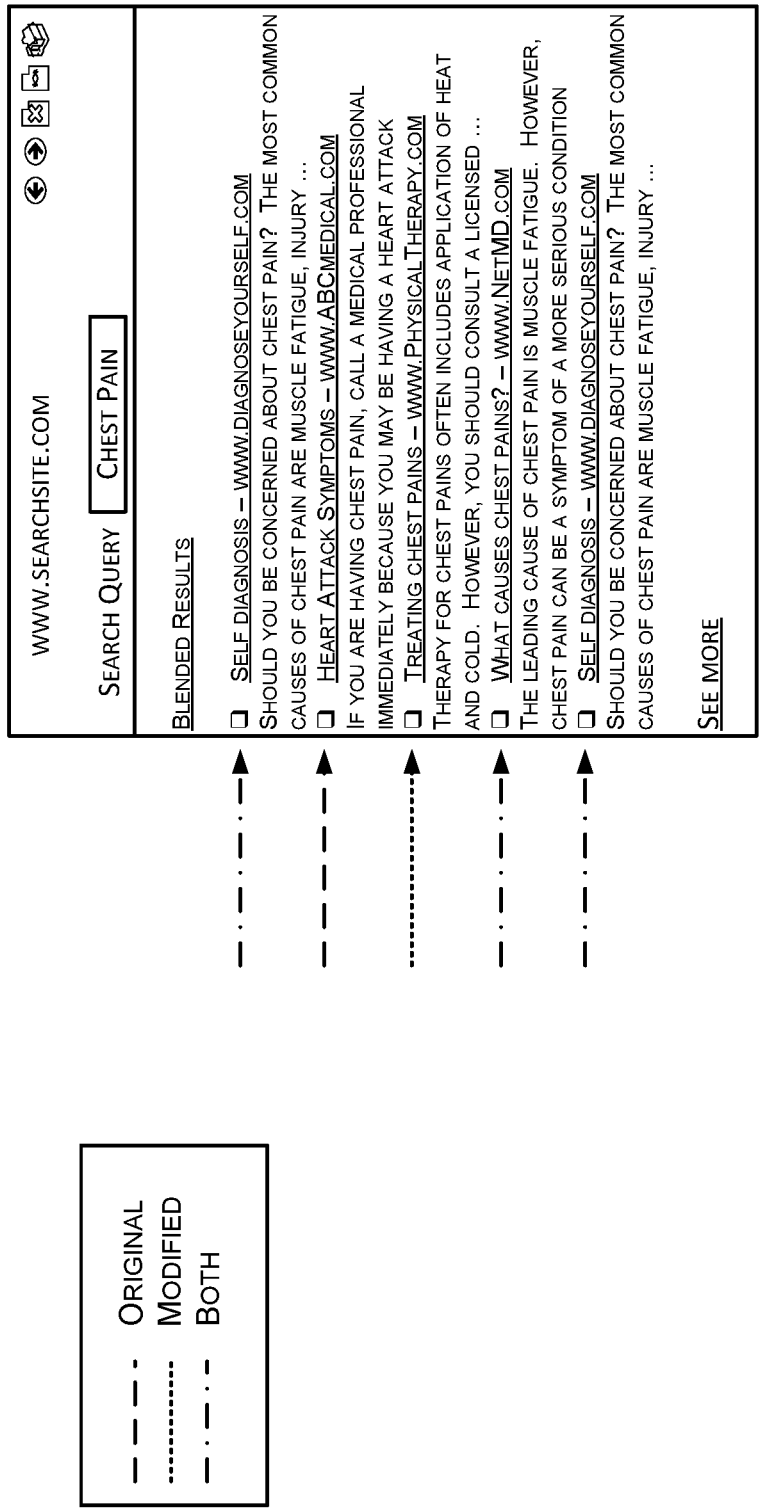
FIG. 6D a schematic diagram illustrating an example user interface displaying a composite format of two sets of search results in a blended format in which entries of a first set of search results are interleaved with entries of a second set of search results.

FIG. 6C is a user interface 622 illustrating an example composite format in which multiple discrete sets of search results are configured for sequential presentation at a client device of the user. In this example, a control 624 is output with multiple sets of search results to allow the user to toggle between the multiple sets of search results at the client side. The control 624 is illustrated in FIG. 6C as a row of tabs disposed across a top of the interface 622 within a browser window. However, in other examples, the control may comprise a radio button, a hyper link, a menu, an icon, or any other mechanism that may be used to switch from one view to another. In the illustrated example, user selection of a tab of the control 624 causes presentation of results associated with the selected tab. The interface 622 illustrates a view in which a first tab 626 entitled "basic" is selected and a set of popularity based search results are presented. Upon user selection of a second tab 630 entitled "unbiased," the view toggles to present a second interface 630 which presents a second set of search results that compensates for bias by taking into account veracity of the search results. Using the control usable 624 the user is able to toggle between the first search results and the second search at the client device.

FIG. 6D is a user interface 632 illustrating an example composite format in which multiple sets of search results are blended together to for concurrent presentation. Specifically, as shown in interface 632 entries from the original search results (noted by the dashed arrows) and modified search results (noted by the dotted arrows) are interleaved together to provide the blended results. Entries that are common to both the original and modified results are noted by dot-dash arrows. The entries in the blended results may be interleaved in an alternating fashion (first modified results, first original result, second modified result, second original result, etc.), or the ranking algorithms used for the original results and the modified results may be merged (e.g., rankings for each entry under both algorithms may be averaged) and presented in an order based on the merged ranking.

Example Bias Detection and/or Compensation of Individualized Bias

Figure 7:
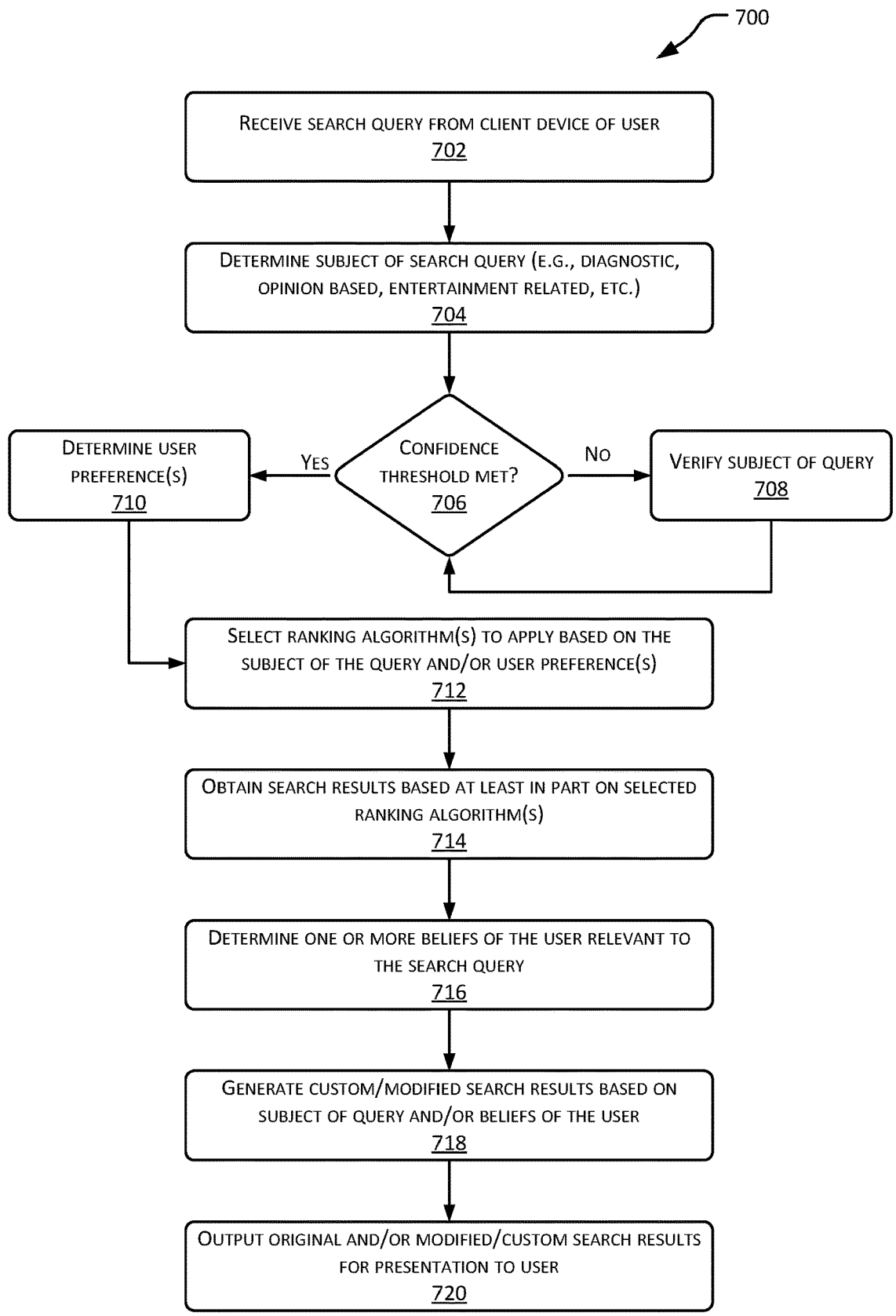
FIG. 7 is a flow diagram of an example process 700 usable to detect and/or compensate for individualized bias.

FIG. 7 is a flow diagram of an example process 700 usable to detect and/or compensate for individualized bias. The process 700 may be performed by a computing device, such as a search engine (e.g., search engine 104) or other website or service.

At operation 702, the computing device receives a search query from a client device of a user via one or more communication connections (e.g., communication connections 220). At operation 704, the computing device determines a type or "subject" of the search query. The subject of the search query may be determined by the terms used in the search query and/or the way in which the query is framed (i.e., the format or structure of the query). Certain terms may be associated with certain types of queries. For instance, terms like "diagnose," "treat," "symptom," "cause," "help," "fix," "troubleshoot," etc. may be associated with diagnostic subjects. Moreover, diagnostic queries are typically framed in predictable ways (e.g., will action A treat condition X, is symptom B caused by condition Y, does action C fix problem Z, etc.). As another example, terms having to do with religion or politics may be associated with opinion based subjects. As yet another example, names of actors, movies, artists, songs, etc. may be associated with entertainment related subjects. The computing device may compare the received search query to one or more lists of terms, previous queries, and/or common query formats to determine the subject of the query. Based on the terms used and the format/structure of the search query, the computing device may determine the subject of the search query (e.g., whether the subject is diagnostic in nature, opinion based, entertainment related, etc.)

At operation 706, if the subject of the query has not been determined with sufficient certainty (e.g., a confidence threshold has not been met), then the computing device may, at operation 708, attempt to verify the subject matter of the query by, for example, asking the user to indicate a type of query. This verification may be in the form of one or more questions presented to the user to clarify the nature of the query (e.g., "are you attempting to diagnose a condition?," "by 'Madonna' do you mean the religious personage, the singer, the artwork?", etc.). Based on the responses received from the user, the computing device may be able to discern the subject of the query. This verification 708 may be repeated until the subject of the query is determined to the threshold confidence level.

If, at operation 706, the subject of the query is determined to a sufficient level of certainty (i.e., the confidence threshold is met), the computing device may at, operation 710, to determine whether user preferences exist regarding the type of ranking algorithm to apply. For instance, the computing device may check to see whether the user has manifest an explicit or implicit (e.g., based on prior search behavior) preference for veracity of search results, validation of the user's beliefs, etc. User preferences may be absolute (e.g., always apply a veracity based ranking algorithm to present the most accurate search results, or never use a veracity based ranking algorithm), or may be conditional (e.g., use a veracity based algorithm for diagnostic queries, but use a popularity based algorithm for all other query subjects).

At operation 712, the computing device selects a ranking algorithm to apply, from among multiple available ranking algorithms, based at least in part on the subject of the query and/or the user's preference(s). The multiple available ranking algorithms may include at least a first ranking algorithm that is based at least in part on veracity of content of the search results, and a second ranking algorithm that does not take into account veracity of content of the search results. In some examples, when the subject of the search query is determined at operation 704 to be diagnostic, at operation 710 the computing device selects the first ranking algorithm, which takes into account veracity. In contrast, in such examples, when the subject of the search query is determined at operation 704 to be opinion based (e.g., politics, religion, entertainment, etc.), at operation 710 the computing device selects the second ranking algorithm, which does not take into account veracity. In other examples, other ranking algorithms may be selected depending on the subject of the search query. In some examples, multiple ranking algorithms may be selected.

Once one or more ranking algorithms have been selected, at operation 714, the computing device may obtain search results based at least in part on the selected ranking algorithm(s). If multiple ranking algorithms were selected in operation 712, then multiple sets of search results may be obtained at operation 714.

In some examples, at operation 716, the computing device may determine one or more beliefs of the user relevant to the search query. The computing device may determine the beliefs of the user that are relevant to the search query by reference to a belief model of the user (e.g., belief model 128 in FIG. 1). The belief information may be obtained by explicit information provided by the user or by inference based on search history of the user or client device, clickthrough history of the user or client device, and/or browser history of the user or client device. As discussed above, belief information may be obtained prior to receiving the search query (e.g., when the user accesses a search engine or web site, creates an account, opens or initializes an application, etc.) or after receiving the search query (e.g., in response to one or more questions or prompts soliciting information from the user of the client device).

At operation 718, the computing device may generate modified search results (e.g., modified search results 136) for the user based at least in part on the search query and the one or more beliefs of the user. In other examples, operation 718 may be performed contemporaneously with obtaining the search results, such that custom search results are generated for the user without first preliminary search results. In some examples, entries of the modified/custom search results may be ordering to compensate for one or more biases of the user. Additionally or alternatively, in some examples, the results may be further modified/customized based At operation 720, the computing device may transmit the search results (original/preliminary and/or modified/custom) to the client device for presentation to the user.

The processes 300, 400, and 700 are described with reference to the architecture 100 and system 200 of FIGS. 1 and 2 for convenience and ease of understanding. However, the processes 300, 400, and 700 are not limited to being performed using the architecture 100 and system 200. Moreover, the architecture 100 and system 200 are not limited to performing the processes 300, 400, and 700.

The processes 300, 400, and 700 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process may be omitted entirely. Moreover, the processes 300, 400, and 700 may be combined in whole or in part. For instance, the process 300 of query reformulation may be performed in combination with one or more of the result modification processes 400 and/or 700.

The various techniques described herein may be implemented in the context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Conclusion

In closing, although the various embodiments have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method, comprising:
    obtaining search results, the search results including multiple entries;
    detecting, from among the multiple entries, at least one entry that is biased;
    modifying the at least one entry with a visual indicator to indicate the at least one entry is detected as being biased; and
    outputting the search results for presentation at a client device.

2. The method of claim 1, wherein the modifying includes annotating the at least one entry with an indication identifying that the at least one entry is biased.

3. The method of claim 2, wherein the modified form includes an annotated form.

4. The method of claim 1, wherein the detecting includes communicating with an authority to determine whether the at least one entry is biased.

5. The method of claim 1, further comprising determining a confidence level score that the at least one entry is biased.

6. The method of claim 1, wherein, in the outputting, the at least one entry is presented less prominently relative to the others ones of the multiple entries.

7. The method of claim 1, further comprising prioritizing at least one of the multiple entries based on a veracity determination.

8. The method of claim 1, further comprising downranking the at least one entry detected as being biased.

9. The method of claim 1, wherein the outputting outputs the search results for presentation at the client device such that at least one of the other ones of the multiple entries is presented in an emphasized manner relative to the at least one entry.

10. A system, comprising:
a memory storing instructions; and
a processor arranged to execute the instructions to perform operations, comprising:
obtaining search results, the search results including multiple entries;
detecting, from among the multiple entries, at least one entry that is determined, based on one or more factors, to be biased;
modifying the at least one entry detected as being biased; and
outputting the search results for presentation at a client device, such that the at least one entry is presented at the client device in modified form relative to other ones of the multiple entries to indicate the at least one entry is detected as being biased.

11. The system of claim 10, wherein the modifying includes annotating the at least one entry with an indication identifying that the at least one entry is biased.

12. The system of claim 10, wherein the detecting includes communicating with an authority to determine whether the at least one entry is biased.

13. The system of claim 10, wherein, in the outputting, the at least one entry is presented less prominently relative to the others ones of the multiple entries.

14. The system of claim 10, wherein the method further comprises prioritizing at least one of the multiple entries based on a veracity determination.

15. The system of claim 10, wherein the method further comprises downranking the at least one entry detected as being biased.

16. The system of claim 10, wherein the outputting outputs the search results for presentation at the client device such that at least one of the other ones of the multiple entries is presented in an emphasized manner relative to the at least one entry.

17. A computer-readable hardware storage device storing instructions that, when executed by a computer processor, cause the computer processor to perform operations, comprising:
obtaining search results, the search results including multiple entries;
detecting, from among the multiple entries, at least one entry that is biased based, at least in part, on a comparison between the at least one entry and a source of information;
modifying the at least one entry detected as being biased; and
outputting the search results for presentation at a client device, such that the at least one entry is presented at the client device in modified form relative to other ones of the multiple entries to indicate the at least one entry is detected as being biased.

18. The computer-readable hardware storage device of claim 17, wherein the modifying includes annotating the at least one entry with an indication identifying that the at least one entry is biased.

19. The computer-readable hardware storage device of claim 17, wherein the detecting includes communicating with an authority to determine whether the at least one entry is biased.

20. The computer-readable hardware storage device of claim 17, wherein, in the outputting, the at least one entry is presented less prominently relative to the others ones of the multiple entries.

* * * * *